United States Patent
Liu et al.

(10) Patent No.: US 11,610,090 B2
(45) Date of Patent: Mar. 21, 2023

(54) COMBINATION RFID/EAS TAGS AND METHODS OF MANUFACTURE

(71) Applicant: SML Intelligent Inventory Solutions LLC, Plano, TX (US)

(72) Inventors: Yichang Liu, Holly Springs, NC (US); Mohammed Ramzan, Halifax (GB); Mark Anton Abraham, Northamptonshire (GB)

(73) Assignee: SML INTELLIGENT INVENTORY SOLUTIONS LLC, Plano, TX (US)

( * ) Notice: Subject to any disclaimer, the term of this patent is extended or adjusted under 35 U.S.C. 154(b) by 0 days.

(21) Appl. No.: 17/595,688

(22) PCT Filed: May 7, 2020

(86) PCT No.: PCT/US2020/070032
§ 371 (c)(1),
(2) Date: Nov. 22, 2021

(87) PCT Pub. No.: WO2020/237251
PCT Pub. Date: Nov. 26, 2020

(65) Prior Publication Data
US 2022/0222502 A1 Jul. 14, 2022

Related U.S. Application Data

(60) Provisional application No. 62/852,181, filed on May 23, 2019.

(51) Int. Cl.
*G06K 19/077* (2006.01)
*G08B 13/24* (2006.01)

(52) U.S. Cl.
CPC . *G06K 19/07718* (2013.01); *G06K 19/07724* (2013.01); *G06K 19/07767* (2013.01);
(Continued)

(58) Field of Classification Search
None
See application file for complete search history.

(56) References Cited

U.S. PATENT DOCUMENTS

| | | | |
|---|---|---|---|
| 8,093,996 B2* | 1/2012 | Heurtier | G06K 19/07749 340/568.1 |
| 2007/0056683 A1* | 3/2007 | Manes | G06K 19/07749 156/264 |

(Continued)

*Primary Examiner* — Thomas S McCormack
(74) *Attorney, Agent, or Firm* — Boisbrun Hofman, PLLC; Roger Burleigh

(57) ABSTRACT

Disclosed are combination radio frequency identification (RFID) and electronic article surveillance (EAS) tags and methods of producing such tags using a converting machine. The method is characterized by feeding a first roll carrying first type inlays and a second roll carrying second type inlays into a converting machine; and, transferring, using the converting machine, the first type inlays to a surface of the second type inlays, thereby forming a two-layer tape carrying pairs of first and second type inlays, each of the pairs comprising an RFID inlay and an EAS inlay, wherein there is no overlap of an RFID antenna element of each RFID inlay and an EAS antenna element of a paired EAS inlay, and wherein the RFID inlay and the EAS inlay of each pair are functionally independent.

27 Claims, 4 Drawing Sheets

(52) U.S. Cl.
CPC ..... *G06K 19/07786* (2013.01); *G08B 13/244* (2013.01); *G08B 13/2417* (2013.01)

(56) References Cited

U.S. PATENT DOCUMENTS

| | | | |
|---|---|---|---|
| 2007/0090955 A1* | 4/2007 | Cote | G06K 19/07718 |
| | | | 340/572.5 |
| 2008/0150719 A1 | 6/2008 | Cote et al. | |
| 2009/0189768 A1 | 7/2009 | Copeland et al. | |
| 2009/0231139 A1 | 9/2009 | Heurtier | |
| 2010/0001079 A1* | 1/2010 | Martin | G08B 13/2414 |
| | | | 235/492 |
| 2010/0259392 A1 | 10/2010 | Chamandy et al. | |
| 2012/0019385 A1* | 1/2012 | Brodzik | G08B 13/2434 |
| | | | 340/572.9 |
| 2012/0235870 A1 | 9/2012 | Forster | |
| 2016/0086465 A1 | 3/2016 | Li et al. | |
| 2017/0124919 A1* | 5/2017 | Karan | G06K 19/06028 |
| 2017/0193776 A1 | 7/2017 | West et al. | |
| 2018/0211499 A1 | 7/2018 | Forster | |

\* cited by examiner

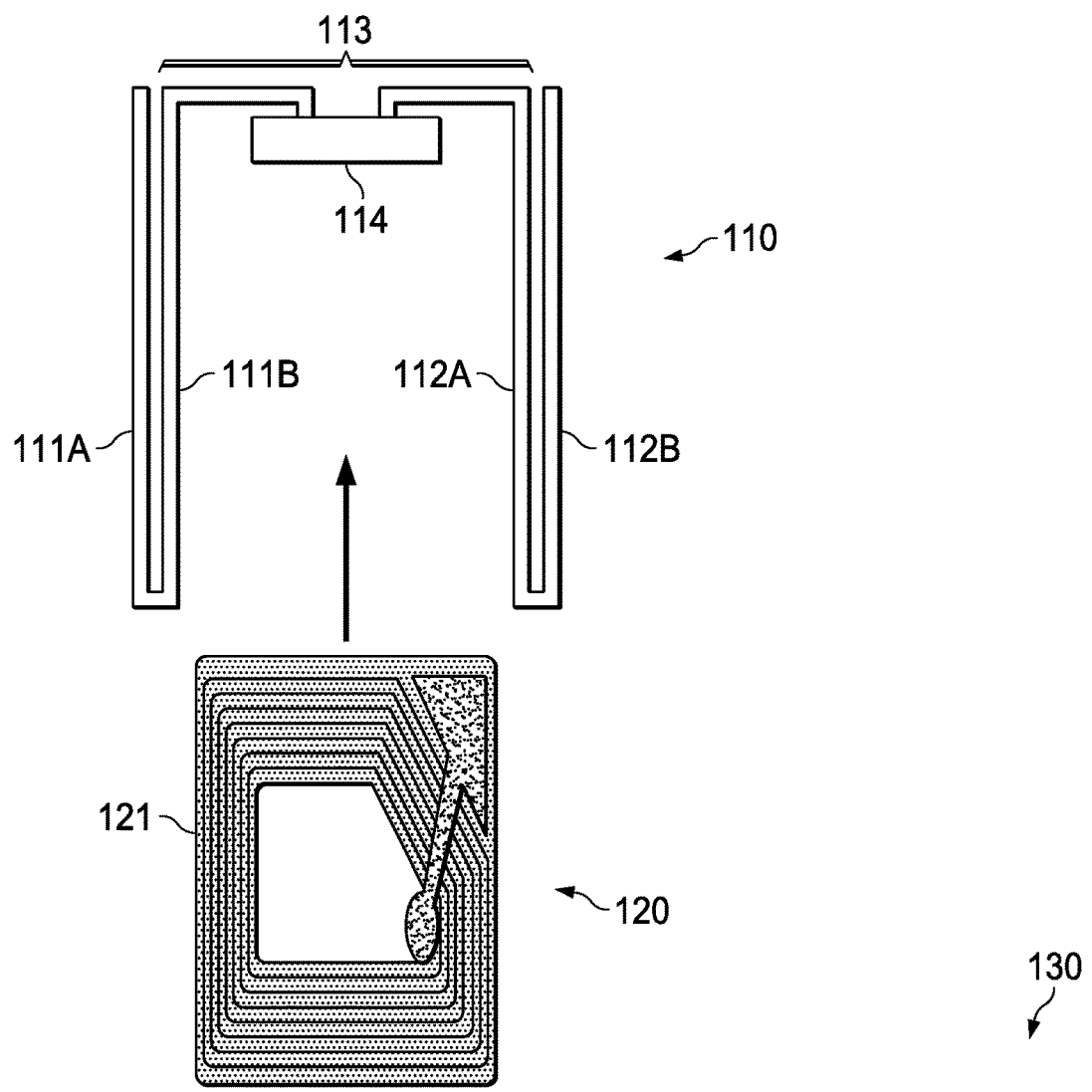
FIG. 1-A
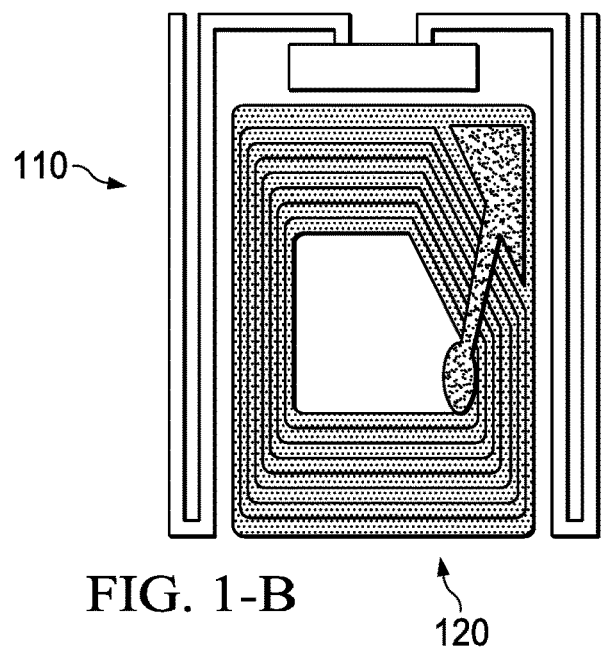
FIG. 1-B

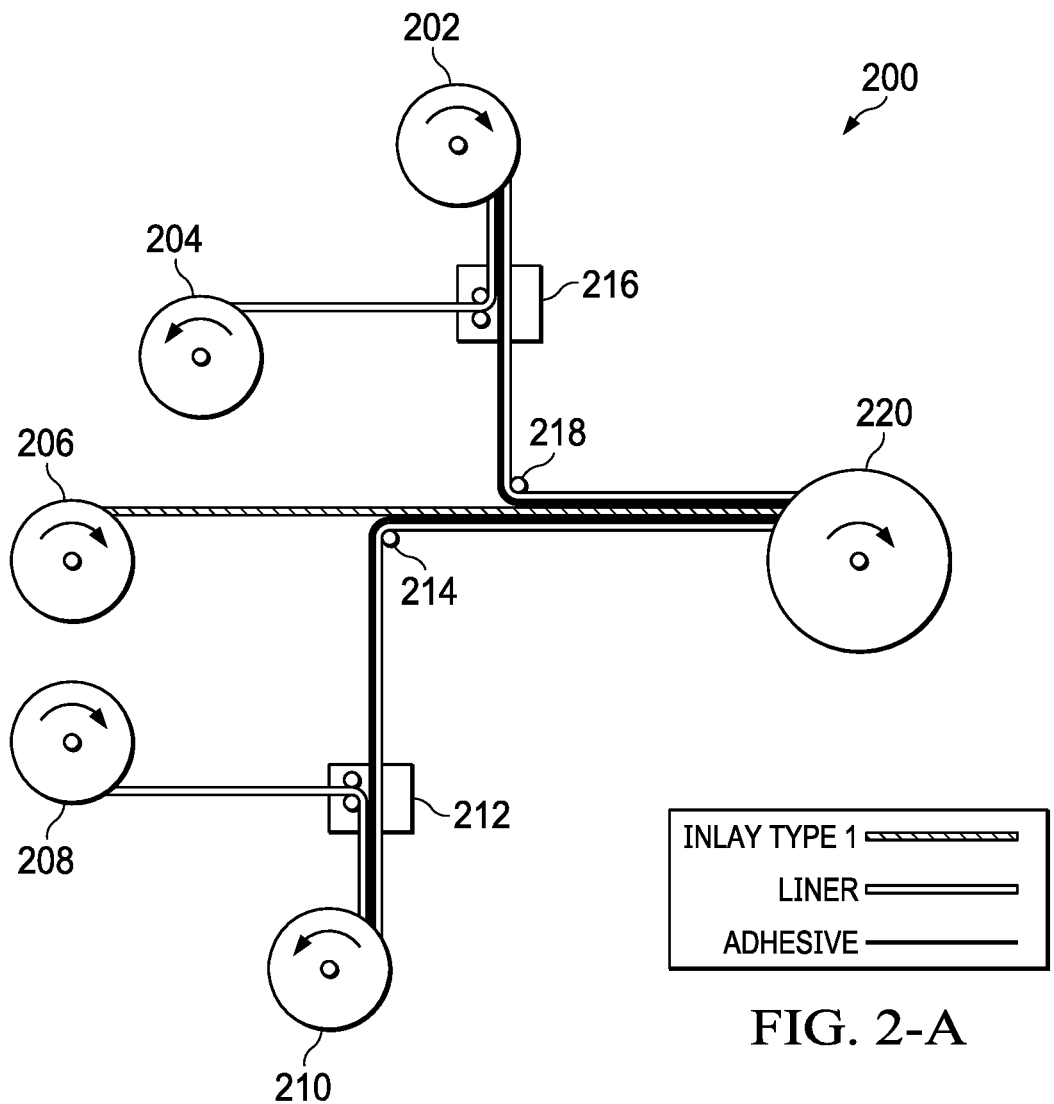
FIG. 2-A

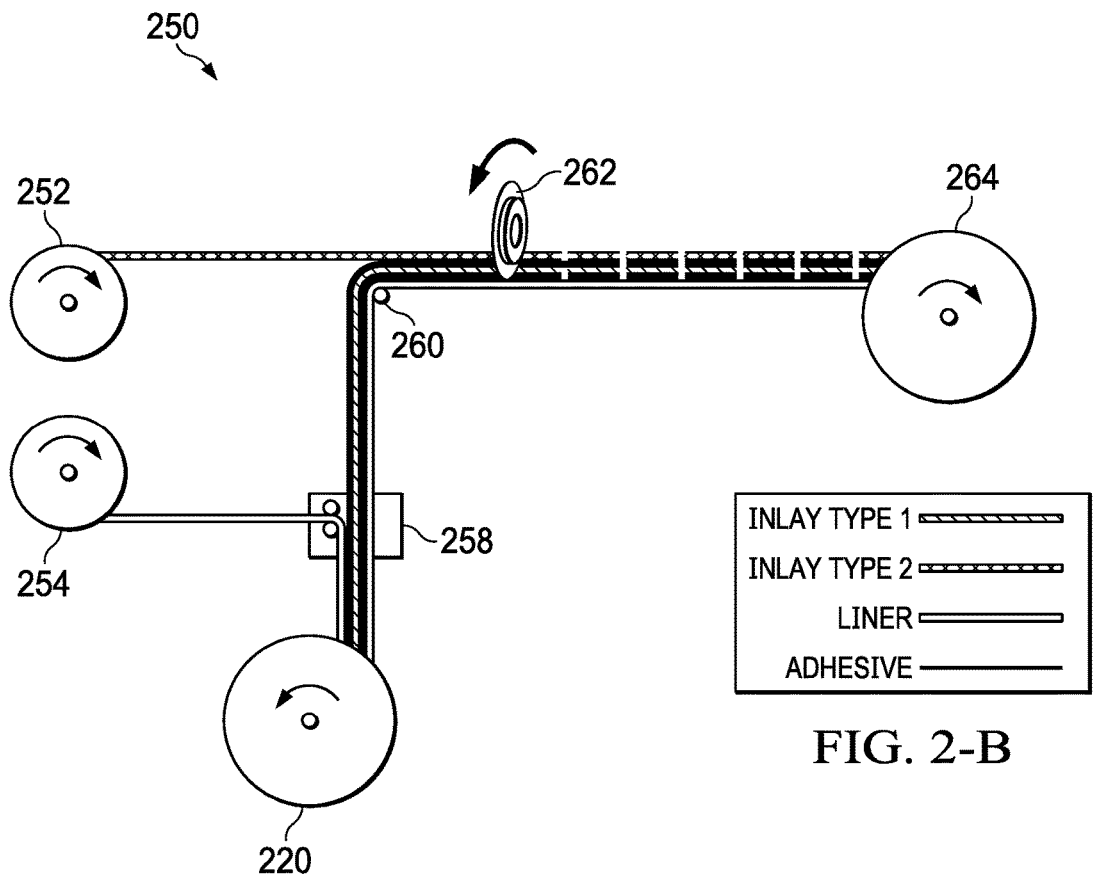
FIG. 2-B
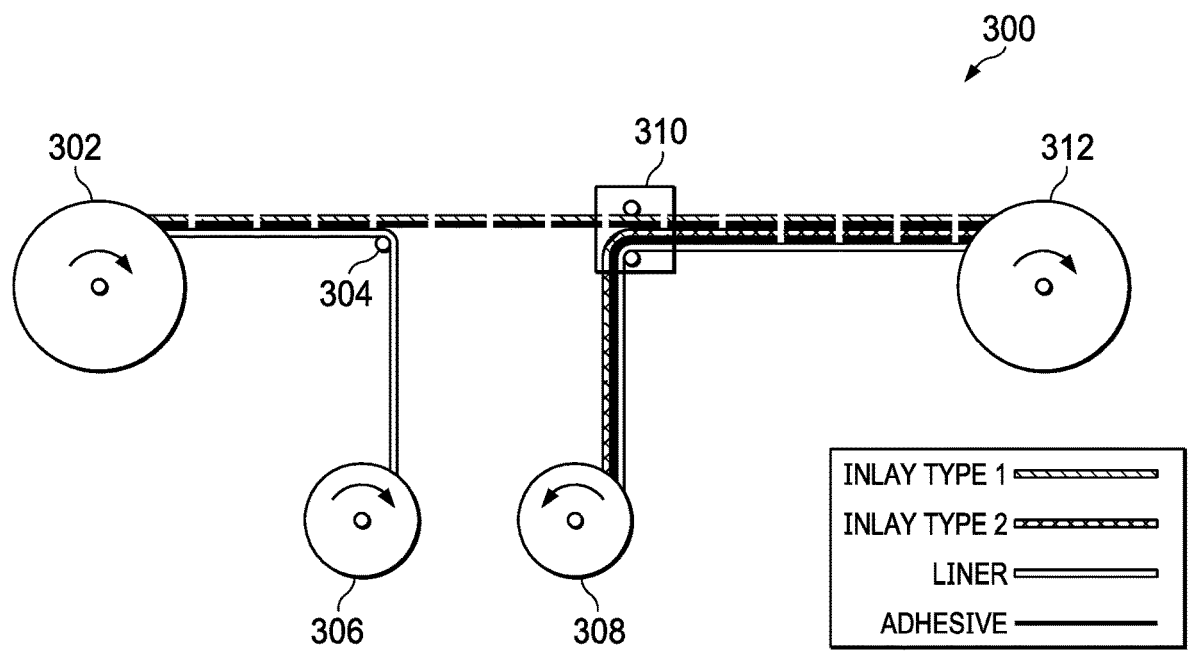
FIG. 3

COMBINATION RFID/EAS TAGS AND METHODS OF MANUFACTURE

CROSS-REFERENCE TO RELATED APPLICATION

This application is a U.S. national stage application and claims the benefit of International Application No. PCT/US2020/070032, filed on May 7, 2020, entitled "COMBINATION RFID/EAS TAGS AND METHODS OF MANUFACTURE," which was published in English as International Publication Number WO 2020/237251 Al, on Nov. 26, 2020, and which claims priority to U.S. Provisional application Ser. No. 62/852,181, filed on May 23, 2019, which is incorporated herein by reference.

TECHNICAL FIELD

The disclosure is directed, in general, to radio frequency identification (RFID) and electronic article surveillance (EAS) tags; and, in particular, to combination RFID/EAS tags and methods of manufacture thereof.

BACKGROUND

Radio frequency identification (RFID) uses electromagnetic fields to identify and track tags attached to objects. An RFID tag consists of three different components: an RFID "chip", which is an integrated circuit (IC), and an antenna, both affixed to a substrate. When triggered by an electromagnetic interrogation pulse from an RFID reader device, the tag transmits digital data, usually an identifying inventory number, back to the reader; the number can be used to inventory goods. There are two types of RFID tags; passive tags are powered by energy from an RFID reader's interrogating radio waves, and active tags are powered by a battery and can be read at a greater range from the RFID reader (up to hundreds of meters). Unlike a barcode, an RFID tag doesn't need to be within the line of sight of the reader, so it may be embedded in the tracked object.

An RFID tag IC has a logic unit that makes decisions and provides memory for stored data, such as a unique product ID. An RFID tag antenna, connected to the tag IC, is the largest part of the tag. The geometry of an antenna is determined by the frequency at which the tag operates; variations in antenna design allow tags to have different properties and behaviors. The antenna can be shaped, for example, as a spiral coil, a single dipole, dual dipoles (one perpendicular to other), or a folded dipole. The antenna is designed for a specific frequency of operation and the designated frequency determines an effective antenna length. A substrate holds the RFID IC and antenna together; an antenna can be deposited or printed on the substrate, and the IC is then attached to the antenna and the substrate. A substrate can be made from flexible material such as thin plastic, but it may also be made from rigid material. Most passive tags use substrates made from flexible material with a thickness of 100 to 1000 nm. Suitable materials for a substrate include polymer, PVC, Polyethylenetherephtalate (PET), phenolics, polyesters, styrene, and even paper. The substrate material may affect the design frequency of the antenna; therefore, the effect of substrate material must be considered during proper tuning of the antenna.

Electronic article surveillance (EAS) is a technological method to prevent shoplifting from retail stores, pilferage of books from libraries or removal of properties from office buildings. Special tags are fixed to merchandise, books or other physical items; the tags are removed or deactivated when an item is properly purchased or authorized for removal from the premises. At the exits of a facility, a detection system sounds an alarm or otherwise alerts the staff when the system senses an active tag; some stores also have detection systems at the entrance to restrooms that sound an alarm if someone tries to take unpaid merchandise with them into the restroom. One common type of EAS tag utilizes radio frequencies; such RF EAS tags are essentially a resonant circuit comprising an inductor and capacitor. Sensing an RF EAS tag is achieved by sweeping around the resonant frequency and detecting a dip. Deactivation for EAS tags is typically achieved using a deactivation pad, which partially destroys the capacitor by applying a strong electromagnetic field at the resonant frequency, inducing a voltage that exceeds the capacitor's breakdown voltage. In the absence of such a device, labels can be rendered inactive by punching a hole, or by covering the circuit with a metallic label (i.e., a "detuner").

For retail applications, it is desirable for articles to have both RFID and EAS tags; an RFID tag for the purpose of inventory management and an EAS tag for security/theft prevention. Including both types of tags, particularly in combination, can present technical issues and additional costs. Accordingly, there is a need in the art for novel combination RFID/EAS tags that overcome the deficiencies of the prior art.

SUMMARY

To address the deficiencies of the prior art, disclosed herein are methods of producing combination radio frequency identification (RFID) and electronic article surveillance (EAS) tags using a converting machine. The method is characterized by feeding a first roll carrying first type inlays and a second roll carrying second type inlays into a converting machine; and, transferring, using the converting machine, the first type inlays to a surface of the second type inlays, thereby forming a two-layer tape carrying pairs of first and second type inlays, each of the pairs comprising an RFID inlay and an EAS inlay, wherein there is no overlap of an RFID antenna element of each RFID inlay and an EAS antenna element of a paired EAS inlay, and wherein the RFID inlay and the EAS inlay of each pair are functionally independent. The disclosed method has the advantage of utilizing RFID and EAS tags which can be used separately as well as being easily combined for applications requiring both functionalities.

The step of transferring the first type inlays to a surface of the second type inlay can be accomplished through multiple methods using conventional converting machines. According to one exemplary embodiment, the step of transferring the first type inlays to a surface of the second type inlays comprises removing a waste liner from the first roll to expose an adhesive layer operative to bond the first type inlays and the second type inlays. In a second exemplary embodiment, the second roll carrying the second type inlays is produced by laminating transfer tape to both sides of a substrate carrying the second type inlays, the transfer tape comprising an adhesive layer operative to bond to the substrate and a removable waste liner. Subsequently, the step of transferring the first type inlays to a surface of the second type inlays comprises removing the waste liner from the transfer tape on one side of the second roll, exposing the adhesive layer, and laminating the first type inlays carried by the first roll thereto. In certain embodiments, the inlays on the first or second rolls, or both, are individually transferable from their roll to the surface of the inlays on the other roll.

The method of producing combination RFID/EAS tags using a converting machine, as disclosed herein, has the further advantage of independent quality-control testing of each RFID and EAS inlay prior to combining them; such testing prevents wastage associated with transferring a defective first type inlay to a functional second type inlay, and vice versa. This is particularly of advantage for RFID inlays including an integrated circuit, which have a higher likelihood of being defective than an inlay only comprising passive circuitry. In a first such embodiment, the method of producing the combination tags includes testing each of the first type inlays, prior to the step of transferring to a surface of the second type inlays, and indicating defective ones thereof; and, for each defective first type inlay, advancing the roll carrying the first type inlays to avoid transferring a defective first type inlay to a second type inlay. Similarly, the method can include testing each of the second type inlays, prior to the step of transferring a first type inlay thereto, and indicating defective ones thereof; and, for each defective second type inlay, advancing the roll carrying the second type inlays to avoid laminating a first type inlay to a defective second type inlay. For both tests, indicating defective inlays can comprise applying a visible mark proximate to a defective inlay and the step of advancing the roll carrying the inlays is automatically performed in response to optically reading the visible mark just prior to the step of transferring. Alternatively, indicating defective inlays comprises storing a reference location associated with a defective inlay, the reference location indicative of the position of a defective inlay on the roll carrying it, and the step of advancing the roll carrying the inlays is automatically performed when the reference location reaches a location where the defective inlay would otherwise be laminated to the other type of inlay.

The first type inlay can be an EAS inlay and the second type inlay can be an RFID inlay, or vice versa. In the specifically disclosed embodiments, an EAS inlay comprises a coil antenna and an RFID inlay comprises a dipole antenna having first and second legs, wherein the coil antenna of an EAS inlay is substantially positioned between the first and second legs of the dipole antenna of an RFID inlay of each combination RFID/EAS tag. In a specific embodiment, the first and second legs of the dipole antenna comprise folded-back portions for tuning the dipole antenna to a desired operational frequency. The center portion of the dipole antenna and the first and second legs can form a "U" shape; in such embodiments, the coil antenna of the EAS inlay can be substantially positioned between the first and second legs of the dipole antenna of the RFID inlay, thereby minimizing the total surface area required for both inlays on a combination RFID/EAS tag.

Following the step of transferring the first type inlays to a surface of the second type inlays, thereby forming a two-layer tape carrying pairs of first and second type inlays, the two-layer tape can be cut, or partially cut, at locations between each pair, thereby forming individual combination RFID/EAS tags. The combination RFID/EAS tags comprise a substrate carrying an RFID inlay, the RFID inlay comprising an RFID antenna element and integrated circuit coupled thereto; and, an EAS inlay laminated to the RFID inlay, the EAS inlay comprising an EAS antenna element, wherein there is no overlap of the EAS antenna element and the RFID antenna element, and wherein the RFID inlay and the EAS inlay are functionally independent.

The foregoing has broadly outlined the essential and optional features of the various embodiments that will be described in detail hereinafter; the essential and certain optional features form the subject matter of the appended claims. Those skilled in the art should recognize that the principles of the specifically-disclosed combination RFID/EAS tags, and methods of manufacture thereof, can be utilized as a basis for similar tags and methods of manufacture that are within the scope of the appended claims.

BRIEF DESCRIPTION OF THE DRAWINGS

For a complete understanding of the present disclosure, reference is now made to the following detailed description taken in conjunction with the accompanying drawings, in which:

FIGS. 1-A and 1-B illustrate an exemplary physical layout of a combination RFID/EAS tag according to the principles of the invention;

FIGS. 2-A and 2-B illustrate a first exemplary method of manufacturing combination RFID/EAS tags utilizing a converting machine according to the principles of the invention;

FIG. 3 illustrates a second exemplary method of manufacturing combination RFID/EAS tags utilizing a converting machine according to the principles of the invention; and, FIG. 4 illustrates a flowchart of the essential, and optional, steps of manufacturing combination RFID/EAS tags utilizing a converting machine according to the principles of the invention.

Unless otherwise indicated, corresponding numerals and symbols in the different figures generally refer to corresponding parts or functions.

DETAILED DESCRIPTION

Figure 4:
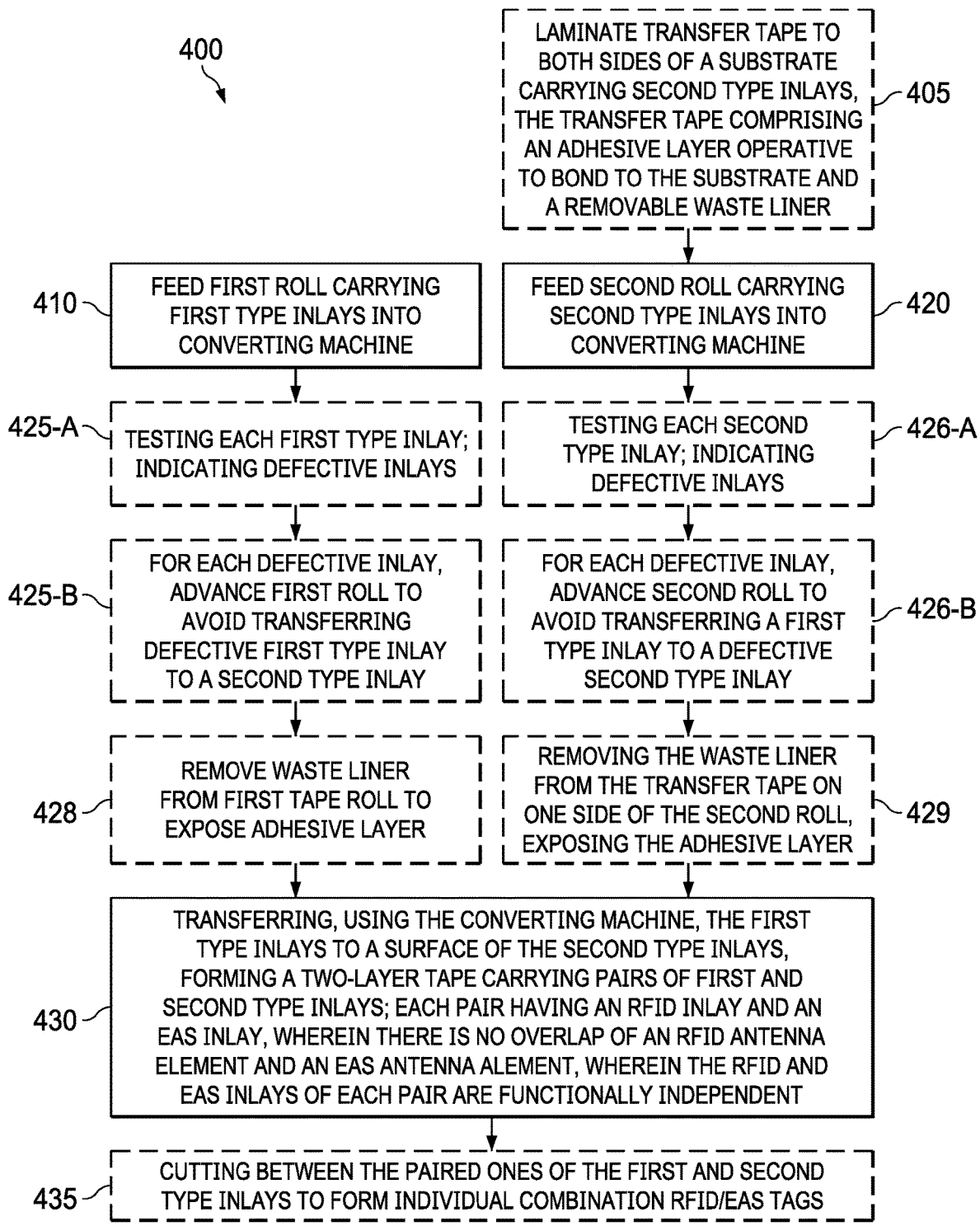

FIGS. 1-A and 1-B illustrate an exemplary physical layout of a combination RFID/EAS tag 130 according to the principles of the invention. The RFID/EAS tag 130 can be manufactured, according to the methods described hereinafter, from first and second rolls carrying RFID and EAS type inlays. For the exemplary RFID/EAS tag 130, as illustrated in FIG. 1-A, an RFID inlay 110 comprises a dipole antenna having first and second legs 111, 112, and the EAS inlay 120 comprises a coil antenna 121. In the embodiment illustrated in FIG. 1-A, the first leg 111 of the dipole antenna is folded back on itself, comprising portions 111A and 111B; similarly, the second leg 112 is folded back on itself, comprising portions 112A and 112B. The lengths of the legs can be selected to tune the dipole antenna to a desired operational frequency. The RFID inlay 110 further includes an integrated circuit (IC) 114 coupled to the dipole antenna. When an EAS inlay 120 is married to an RFID inlay 110, as described hereinafter, the coil antenna 121 of the EAS inlay 120 can be positioned between the first and second legs 111, 112 of the dipole antenna of RFID inlay 110, thereby minimizing the total area required for a combination RFID/EAS tag 130. For example, as illustrated in FIGS. 1-A and 1-B, the center portion 113 of the dipole antenna and the first and second legs 111, 112 form a "U" shape, and the coil antenna 121 of the EAS inlay 120 is positioned therein, thereby minimizing the total surface area required for both inlays on a combination RFID/EAS tag 130.

The first and second rolls, carrying the first and second type inlays, respectively, can be manufactured according to conventional methods known in the art. For example, a tape roll can include a substrate to hold the elements of an inlay.

For a roll carrying RFID type inlays, the dipole antenna is deposited or printed on the substrate and the IC is then attached to the antenna. The substrate is usually made from flexible material; e.g., a polymer, polyvinyl chloride (PVC), polyethylene terephthalate (PET), polyesters, styrene and paper. The substrate material should have a smooth printing surface for antenna layout, durability and stability under various operating conditions, and adequate mechanical support for the antenna, chip, and their interconnections. The substrate material may affect the design frequency of the antenna; therefore, the effect of substrate material should be considered during proper tuning of the antenna.

Turning now to FIGS. 2-A and 2-B, illustrated is a first exemplary method of manufacturing combination RFID/EAS tags utilizing a converting machine; the method includes a first process illustrated in FIG. 2-A, the product of which is utilized in a second process illustrated in FIG. 2-B. An example of a converting machine which can be configured for performing the method is a Speedliner T-165 manufactured by BW Bielomatik; in general, such "converting" machines perform various operations on materials provided on rolls. In the first process, illustrated in FIG. 2-A, a first roll 206 is mounted in the laminating machine, together with first and second transfer tape rolls 202 and 210. The first roll 206 consists of a substrate carrying a first type inlay, either RFID or EAS; the transfer tape rolls 202 and 210 each consist of an adhesive layer between first and second liners. The product of the first process is collected on a roll 220. In operation, a first, or "waste", liner of transfer tape roll 210 is separated and collected by roll 208 and the remaining liner/adhesive is laminated 214 to a first side of roll 206. Similarly, a second "waste" liner of transfer tape roll 202 is separated and collected by roll 204 and the remaining liner/adhesive is laminated 216 to a second side of roll 206. The product of the first process, taken up by roll 220, consists of a substrate carrying first type inlays sandwiched between liner/adhesive layers.

In the second process, illustrated in FIG. 2-B, the product of the first process on roll 220 is laminated to second type inlays. Roll 220 is mounted in the converting machine, together with a second roll 252 carrying the second type inlays (opposite of the type carried by roll 220). In operation, a liner 254 is delaminated 258 to expose the adhesive layer on one side of the first type inlays from roll 220, and the second type inlays from roll 252 are laminated 260 thereto; the product of the second process is collected by roll 264. In certain embodiments, the second process can also include the step of cutting 262 between paired ones of the first and second type inlays at locations between each pair, thereby forming individual combination tags.

Turning now to FIG. 3, illustrated is a second exemplary method of manufacturing combination RFID/EAS tags utilizing a converting machine according to the principles of the invention. A first roll 302, carrying first type inlays, and a second roll 308, carrying second type inlays, are mounted in the converting machine. The first roll 302 consists of first type inlays carried by a transfer tape with a removable waste liner, which is taken up by roll 306, exposing an adhesive layer under at least each first type inlay. The first type inlays are transferred 310 to second type inlays carried by the first roll 308, and the product is collected by roll 312. In some embodiments, the first type inlays carried by first roll 302 are individually transferrable to the surface of the second type inlays carried by second roll 308; alternatively, the first type inlays may be carried by a continuous substrate that is laminated to the surface of the second roll 308.

The foregoing exemplary methods of manufacturing combination RFID/EAS tags utilizing a converting machine can be modified without departing from the principles of the invention. FIG. 4 illustrates a flow chart 400 of the essential, and optional, steps of manufacture. The essential steps comprise feeding a first roll carrying first type inlays 410 and a second roll carrying second type inlays 420 into a converting machine; and, transferring, using the converting machine, the first type inlays to a surface of the second type inlays 430, thereby forming a two-layer tape carrying pairs of first and second type inlays, each of the pairs comprising an RFID inlay and an EAS inlay, wherein there is no overlap of an RFID antenna element of each RFID inlay and an EAS antenna element of a paired EAS inlay, and wherein the RFID inlay and the EAS inlay of each pair are functionally independent. Various means of transferring the first type inlays to a surface of the second type inlays are possible, including the use of cold-roll or hot-roll laminators.

According to one exemplary embodiment, the method 400 further includes the step of removing a waste liner from the first roll to expose an adhesive layer operative to bond the first type inlays and the second type inlays 428. In a second exemplary embodiment, the second roll carrying the second type inlays is produced by laminating transfer tape to both sides of a substrate carrying the second type inlays 405, the transfer tape comprising an adhesive layer operative to bond to the substrate and a removable waste liner. Subsequently, the step of transferring the first type inlays to a surface of the second type inlays comprises removing the waste liner from the transfer tape on one side of the second roll 429, exposing the adhesive layer, and laminating the first type inlays carried by the first roll thereto.

The method of producing combination RFID/EAS tags using a converting machine, as disclosed herein, has the further advantage of independent quality-control testing of each first and second type inlay prior to combining them; such testing prevents wastage associated with transferring a defective first type inlay to a functional second type inlay, and vice versa. This is particularly of advantage for RFID inlays including an integrated circuit, which have a higher likelihood of being defective than an inlay only comprising passive circuitry. The point(s) of testing the inlays can be at any location within the machine prior to the point where the first and second type inlays are laminated. In a first such embodiment, the method of producing the combination tags includes testing each of the first type inlays, prior to the step of transferring to a surface of the second type inlays, and indicating defective ones thereof 425-A; and, for each defective first type inlay, advancing the roll carrying the first type inlays to avoid transferring a defective first type inlay to a second type inlay 425-A. Similarly, the method can include testing each of the second type inlays, prior to the step of transferring a first type inlay thereto, and indicating defective ones thereof 426-A; and, for each defective second type inlay, advancing the roll carrying the second type inlays to avoid laminating a first type inlay to a defective second type inlay 426-B. For both tests, indicating defective inlays can comprise applying a visible mark proximate to a defective inlay and the step of advancing the roll carrying the inlays is automatically performed in response to optically reading the visible mark just prior to the step of transferring. Alternatively, indicating defective inlays comprises storing a reference location associated with a defective inlay, the reference location indicative of the position of a defective inlay on the roll carrying it, and the step of advancing the roll carrying the inlays is automatically performed when the reference location reaches a location where the defective inlay would otherwise be laminated to the other type of inlay.

Finally, the method 400 can further include the step of cutting the tape between paired ones of the first and second type inlays, thereby forming individual combination RFID/EAS tags. The step of cutting may be complete or, alternatively, die cut only through the layers comprising the first and second type inlays, but not through a base substrate or liner such that the die-cut combination RFID/EAS tags can be maintained on a roll for subsequent transfer to separate physical tags (e.g., a paper tag for an article of clothing).

The foregoing has described various embodiments of combination RFID/EAS tags and methods of manufacture thereof; and, in particular, to combination RFID/EAS tags and methods of manufacture using a converting machine. The disclosed apparatus and methods are provided to illustrate the essential and optional features and functions, and those skilled in the art may conceive of alternatives or modifications that do not depart from the principles of the invention as encompassed by the appended claims, and that such alternatives or modifications may be functionally equivalent.

The invention claimed is:

1. A method of producing combination radio frequency identification, RFID, and electronic article surveillance, EAS, tags using a converting machine, comprising the steps of:
    feeding a first roll comprising a first flexible substrate carrying first type inlays and a second roll comprising a second flexible substrate carrying second type inlays into said converting machine, said first and second type inlays spaced at common intervals along said first and second flexible substrates, respectively; and,
    laminating, using said converting machine, said first flexible substrate carrying said first type inlays to a surface of said second flexible substrate carrying said second type inlays, thereby forming a two-layer tape carrying pairs of said first and second type inlays physically isolated by at least one of said first and second substrates, each of said pairs comprising an RFID inlay and an EAS inlay, wherein the RFID inlay and the EAS inlay of each pair are functionally independent.

2. The method recited in claim 1, wherein said step of laminating said first flexible substrate to said second flexible substrate comprises removing a waste liner from said first flexible substrate to expose an adhesive layer operative to bond said first flexible substrate and said second flexible substrate.

3. The method recited in claim 1, wherein said first flexible substrate is discontinuous between each of said first type inlays, whereby individual ones of said first type inlays are transferrable from said first roll to said surface of said second type inlays.

4. The method recited in claim 1, further comprising producing said second roll carrying said second type inlays, comprising the step of laminating transfer tape to both sides of said second flexible substrate carrying said second type inlays, said transfer tape comprising an adhesive layer operative to bond to said substrate and a removable waste liner.

5. The method recited in claim 4, wherein said step of laminating said first flexible substrate to said second flexible substrate comprises removing said waste liner from said transfer tape on one side of said second flexible substrate, exposing said adhesive layer, and laminating said first flexible substrate thereto.

6. The method recited in claim 3, further comprising the steps of:
    testing each of said first type inlays, prior to said step of laminating; and,
    for each defective first type inlay, advancing the roll carrying said first type inlays to avoid transferring a defective first type inlay to a second type inlay.

7. The method recited in claim 6, wherein indicating defective ones of said first type inlays comprises applying a visible mark proximate to a defective inlay and said step of advancing the roll carrying said first type inlays is automatically performed in response to optically reading said visible mark just prior to said step of transferring.

8. The method recited in claim 6, wherein indicating defective ones of said first type inlays comprises storing a reference location associated with a defective inlay, said reference location indicative of the position of said defective inlay on said roll carrying said first type inlays, and said step of advancing the roll carrying said first type inlays is automatically performed when said reference location reaches a location where said defective first type inlay would otherwise be laminated to a second type inlay.

9. The method recited in claim 3, further comprising the steps of:
    testing each of said second type inlays, prior to said step of transferring a first type inlay thereto, and indicating defective ones thereof; and,
    for each defective second type inlay, advancing the roll carrying said second type inlays to avoid laminating a first type inlay to a defective second type inlay.

10. The method recited in claim 9, wherein indicating defective ones of said second type inlays comprises applying a visible mark proximate to a defective inlay and said step of advancing the roll carrying said second type inlays is automatically performed in response to optically reading said visible mark just prior to said step of transferring.

11. The method recited in claim 9, wherein indicating defective ones of said second type inlays comprises storing a reference location associated with a defective inlay, said reference location indicative of the position of said defective inlay on said roll carrying said second type inlays, and said step of advancing the roll carrying said second type inlays is automatically performed when said reference location reaches a location where said first type inlay would otherwise be laminated to said defective second type inlay.

12. The method recited in claim 1, wherein each of said first type inlay is an EAS inlay comprising a coil antenna and each of said second type inlay is an RFID inlay comprising a dipole antenna having first and second legs, wherein the coil antenna of an EAS inlay is substantially positioned between the first and second legs of the dipole antenna of an RFID inlay of each combination RFID/EAS tag.

13. The method recited in claim 12, wherein each of said first and second legs of said dipole antenna comprise folded-back portions for tuning said dipole antenna to a desired operational frequency.

14. The method recited in claim 12, wherein a center portion of said dipole antenna and said first and second legs form a "U" shape.

15. The method recited in claim 14, wherein the coil antenna of said EAS inlay is substantially positioned between the first and second legs of the dipole antenna of said RFID inlay.

16. The method recited in claim 12, wherein said dipole antenna is operational at ultra-high frequencies, UHF.

17. The method recited in claim 1, further comprising the step of cutting said tape carrying paired ones of said RFID and EAS inlays at locations between each pair, thereby forming individual combination RFID/EAS tags.

18. A combination radio frequency identification, RFID, and electronic article surveillance, EAS, tag, comprising:
- a first flexible substrate carrying an RFID inlay, said RFID inlay comprising an RFID antenna element and integrated circuit coupled thereto; and,
- a second flexible substrate carrying an EAS inlay, said EAS inlay comprising an EAS antenna element;
- wherein said first and second flexible substrates are laminated together such that at least one of said first and second substrates physically isolates said RFID inlay from said EAS inlay, and wherein said RFID inlay and said EAS inlay are functionally independent; and,
- wherein said RFID antenna element comprises a dipole antenna having first and second legs and said EAS inlay comprises a coil antenna, wherein the coil antenna of said EAS inlay is substantially positioned between the first and second legs of the dipole antenna of said RFID inlay from the perspective perpendicular to said substrates.

19. The combination RFID and EAS tag recited in claim 18, wherein each of said first and second legs of said dipole antenna comprise folded-back portions for tuning said dipole antenna to a desired operational frequency.

20. The combination RFID and EAS tag recited in claim 18, wherein a center portion (113) of said dipole antenna and said first and second legs form a "U" shape.

21. The combination RFID and EAS tag recited in claim 18, wherein said RFID antenna element is operational at ultra-high frequencies, UHF.

22. The combination RFID and EAS tag recited in claim 18, wherein said first and second substrates have identical lengths and widths.

23. The combination RFID and EAS tag recited in claim 18, wherein there is no overlap of an RFID antenna element of each RFID inlay and an EAS antenna element of said EAS inlay.

24. The combination RFID and EAS tag recited in claim 18, wherein said tag is disposable after use.

25. The method recited in claim 17, wherein said first and second substrates of said individual combination RFID/EAS tags have identical lengths and widths.

26. The method recited in claim 17, wherein there is no overlap of an RFID antenna element of said RFID inlay and an EAS antenna element of said EAS inlay of each of said individual combination RFID/EAS tags.

27. The method recited in claim 17, wherein said combination RFID/EAS tags are disposable after use.

* * * * *